US012573623B2

(12) United States Patent
Tochio et al.

(10) Patent No.: US 12,573,623 B2
(45) Date of Patent: Mar. 10, 2026

(54) NONAQUEOUS ELECTROLYTE SECONDARY BATTERY

(71) Applicant: Panasonic Intellectual Property Management Co., Ltd., Osaka (JP)

(72) Inventors: Takaya Tochio, Nara (JP); Takeshi Ogasawara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 516 days.

(21) Appl. No.: 18/032,847

(22) PCT Filed: Oct. 28, 2021

(86) PCT No.: PCT/JP2021/039766
§ 371 (c)(1),
(2) Date: Apr. 20, 2023

(87) PCT Pub. No.: WO2022/092182
PCT Pub. Date: May 5, 2022

(65) Prior Publication Data
US 2023/0299282 A1 Sep. 21, 2023

(30) Foreign Application Priority Data
Oct. 30, 2020 (JP) ................................. 2020-182822

(51) Int. Cl.
*H01M 4/525* (2010.01)
*H01M 4/02* (2006.01)

(52) U.S. Cl.
CPC ...... *H01M 4/525* (2013.01); *H01M 2004/028* (2013.01)

(58) Field of Classification Search
None
See application file for complete search history.

(56) References Cited

U.S. PATENT DOCUMENTS

| | | |
|---|---|---|
| 2009/0035659 A1 | 2/2009 | Takeuchi et al. |
| 2009/0081548 A1 | 3/2009 | Nakura |

(Continued)

FOREIGN PATENT DOCUMENTS

| | | |
|---|---|---|
| CN | 109970106 A | 7/2019 |
| CN | 110422889 A | 11/2019 |

(Continued)

OTHER PUBLICATIONS

International Search Report dated Dec. 14, 2021, issued in counterpart International Application No. PCT/JP2021/039766, with English translation. (5 pages).

(Continued)

*Primary Examiner* — Carlos Barcena
(74) *Attorney, Agent, or Firm* — WHDA, LLP

(57) ABSTRACT

A nonaqueous electrolyte secondary battery according to one embodiment of the present disclosure is provided with a positive electrode, a negative electrode and a nonaqueous electrolyte; the positive electrode contains a lithium transition metal composite oxide that contains Ni, Nb and M (M is at least one element selected from among Ca and Sr), said lithium transition metal composite oxide optionally containing Co; the contents of Ni, Nb, M and Co in the lithium transition metal composite oxide are respectively within specific ranges; the negative electrode comprises a negative electrode mixture layer that contains a negative electrode active material, and a coating film that is formed on the surface of the negative electrode mixture layer, while containing Nb and M; and the contents of Nb and M in the negative electrode are respectively within specific ranges.

6 Claims, 1 Drawing Sheet

(56)        References Cited

U.S. PATENT DOCUMENTS

| 2010/0209771 | A1 | 8/2010 | Shizuka et al. |
| 2015/0263334 | A1 | 9/2015 | Miyazaki et al. |
| 2016/0293952 | A1 | 10/2016 | Kaneda et al. |
| 2018/0034112 | A1 | 2/2018 | Goto et al. |

FOREIGN PATENT DOCUMENTS

| JP | 2006-310181 | A | 11/2006 |
| JP | 2009-289726 | A | 12/2009 |
| WO | 2006/134851 | A1 | 12/2006 |
| WO | 2014/050114 | A1 | 4/2014 |
| WO | 2015/076323 | A1 | 5/2015 |
| WO | 2016/136212 | A1 | 9/2016 |

OTHER PUBLICATIONS

Written Opinion dated Dec. 14, 2021, issued in counterpart International Application No. PCT/JP2021/039766. (3 pages).
Office Action dated Jan. 11, 2024, issued in counterpart IN Application No. 202347028155, with English Abstraction. (5 pages).

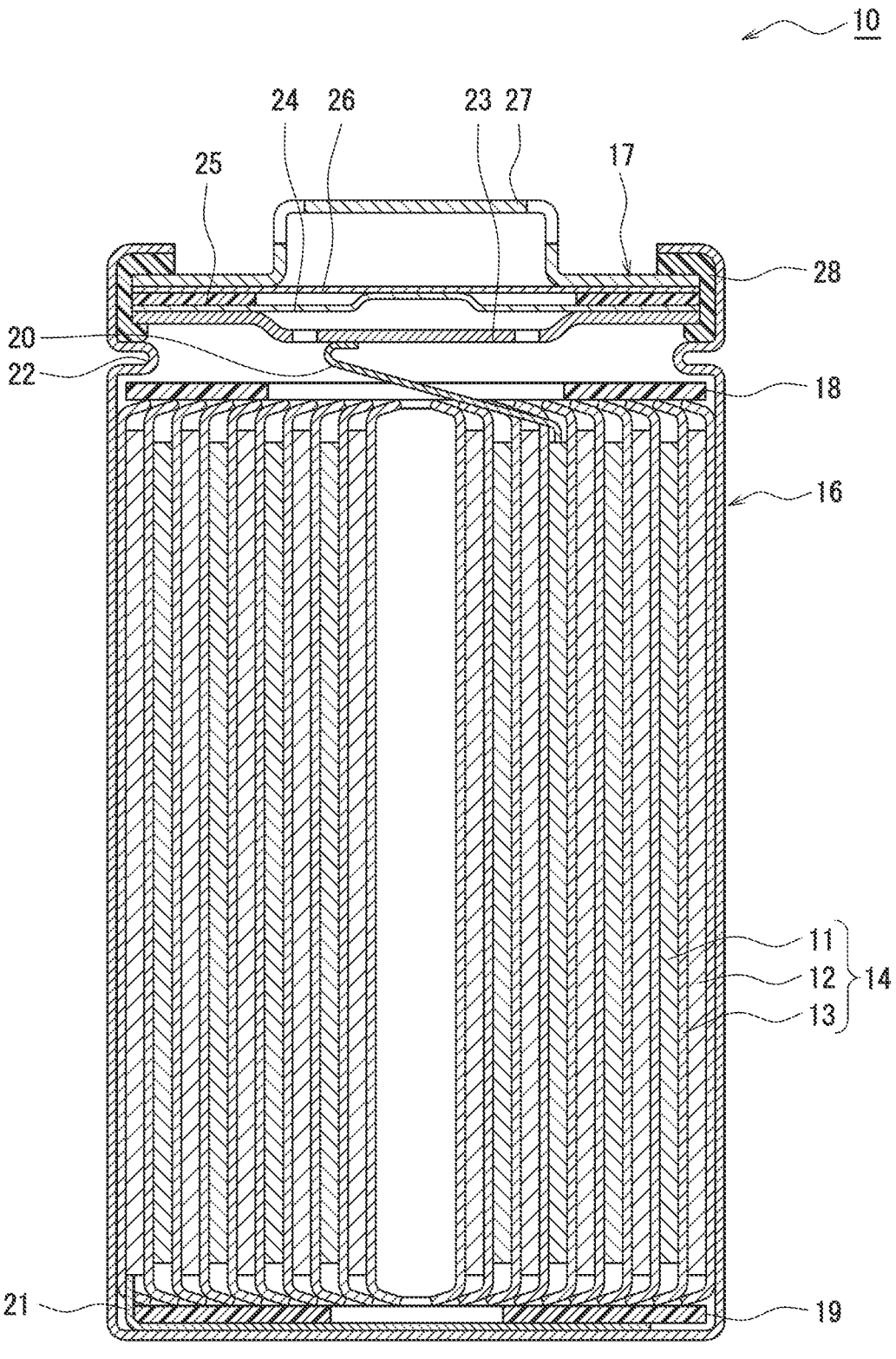

NONAQUEOUS ELECTROLYTE SECONDARY BATTERY

CROSS-REFERENCE TO RELATED APPLICATIONS

This application is a National Phase Application filed under 35 U.S.C. § 371 of International Application No. PCT/JP2021/039766 filed on Oct. 28, 2021, which claims the benefit of priorities under 35 U.S.C. § 119(a) of Japanese Patent Application No. 2020-182822 filed in Japan on Oct. 30, 2020, the contents of which are incorporated herein by reference.

TECHNICAL FIELD

The present disclosure generally relates to a non-aqueous electrolyte secondary battery, and more particularly to a non-aqueous electrolyte secondary battery including a Ni-containing lithium-transition metal composite oxide as a positive electrode active material.

BACKGROUND ART

In recent years, a lithium-transition metal composite oxide with a high Ni content has attracted attention as a positive electrode active material with a high energy density. For example, Patent Literature 1 discloses a positive electrode active material comprising a lithium-transition metal composite oxide represented by the general formula $Li_xNi_{1-y-z-v-w}Co_yAl_zM^1_vM^2_wO_2$, wherein the element $M^1$ represents at least one selected from the group consisting of Mn, Ti, Y, Nb, Mo, and W, and the element $M^2$ represents at least Mg or Ca. Patent Literature 2 discloses a lithium-transition metal composite oxide containing Ni, Mn, and Co, the composite oxide containing at least one selected from the group consisting of Mo, W, Nb, Ta, and Re. The amount of Co used is required to be reduced because Co is expensive.

CITATION LIST

Patent Literature

PATENT LITERATURE 1: Japanese Unexamined Patent Application Publication No. 2006-310181
PATENT LITERATURE 2: Japanese Unexamined Patent Application Publication No. 2009-289726

SUMMARY

Technical Problem

In the lithium-transition metal composite oxide with a high Ni content, reducing a Co content destabilizes the structure of the composite oxide to be likely to cause a side reaction with an electrolyte on particle surfaces of the composite oxide. Thus, it is considered that a large amount of decomposition products of the electrolyte is generated and a coating of the decomposition product is formed on a surface of a negative electrode to deteriorate charge-discharge cycle characteristics of a battery. The art disclosed in Patent Literatures 1 and 2 has still a room for improvement in the cycle characteristics.

An object of the present disclosure is to inhibit lowering in a capacity with charge and discharge in a non-aqueous electrolyte secondary battery using a lithium-transition metal composite oxide with a high Ni content and a low Co content as a positive electrode active material.

Solution to Problem

A non-aqueous electrolyte secondary battery of an aspect of the present disclosure comprises a positive electrode, a negative electrode, and a non-aqueous electrolyte, wherein the positive electrode includes a lithium-transition metal composite oxide containing Ni, Nb, M (M represents at least one element selected from the group consisting of Ca and Sr), and Co that is an optional component. In the lithium-transition metal composite oxide, a content rate of Ni is greater than or equal to 80 mol % based on a total number of moles of metal elements excluding Li, a content rate of Nb is less than or equal to 0.35 mol % based on the total number of moles of metal elements excluding Li, a content rate of M is less than or equal to 1 mol % based on the total number of moles of metal elements excluding Li, and a content rate of Co is less than or equal to 5 mol % based on the total number of moles of metal elements excluding Li. The negative electrode has a negative electrode mixture layer including a negative electrode active material, and a coating containing Nb and M formed on a surface of the negative electrode mixture layer. In the negative electrode, a content rate of Nb is greater than or equal to 10 ppm and less than or equal to 3000 ppm based on a total mass of the negative electrode mixture layer and the coating, and a content rate of M is greater than or equal to 10 ppm and less than or equal to 3000 ppm based on the total mass of the negative electrode mixture layer and the coating.

Advantageous Effects of Invention

An aspect of the present disclosure may inhibit a lowering in a capacity during charge and discharge in a non-aqueous electrolyte secondary battery using a lithium-transition metal composite oxide with a high Ni content and a low Co content as a positive electrode active material. The non-aqueous electrolyte secondary battery according to the present disclosure has excellent charge-discharge cycle characteristics.

BRIEF DESCRIPTION OF DRAWING

FIG. 1 is a sectional view of a non-aqueous electrolyte secondary battery of an example of an embodiment.

DESCRIPTION OF EMBODIMENTS

As described above, it is considered that a lithium-transition metal composite oxide with a high Ni content and a low Co content has an unstable structure to be likely to cause a side reaction with an electrolyte on particle surfaces, resulting in deterioration in the charge-discharge cycle characteristics of a battery. The present inventors have found that using a lithium-transition metal composite oxide containing predetermined amounts of Nb and M (M represents at least one element selected from the group consisting of Ca and Sr) further inhibits, in a positive electrode, generation and erosion of a deteriorated structure layer on a surface of the lithium-transition metal composite oxide due to a reaction with an electrolyte liquid and the like, and on a surface of a negative electrode, forms a good coating containing Nb and M derived from the positive electrode to improve the charge-discharge cycle characteristics.

Note that, when conventional lithium-transition metal composite oxides are used, a decomposition product of an electrolyte is likely to form a coating containing a large amount of Li on the surface of the negative electrode, and the coating is presumed to be a cause of deterioration in the charge-discharge cycle characteristics. In the non-aqueous electrolyte secondary battery according to the present disclosure, it is considered that forming such a coating is inhibited, and instead thereof, the good coating containing Nb and M is formed on the surface of the negative electrode to remarkably improve the charge-discharge cycle characteristics.

The description "greater than or equal to a numerical value (A) and less than or equal to a numerical value (B)" herein means greater than or equal to numerical value (A) and less than or equal to the numerical value (B).

Hereinafter, an example of an embodiment of a positive electrode active material for the non-aqueous electrolyte secondary battery according to the present disclosure and a non-aqueous electrolyte secondary battery using the positive electrode active material will be described in detail. Hereinafter, a cylindrical battery in which a wound electrode assembly 14 is housed in a bottomed cylindrical exterior housing can 16 will be exemplified, but an exterior is not limited to a cylindrical exterior housing can and may be, for example, a rectangular exterior housing can and may be an exterior constituted with laminated sheets including a metal layer and a resin layer. The electrode assembly may be a stacked electrode assembly in which a plurality of positive electrodes and a plurality of negative electrodes are alternately stacked with separators interposed therebetween.

FIG. 1 is a sectional view of a non-aqueous electrolyte secondary battery 10 of an example of an embodiment. As exemplified in FIG. 1, the non-aqueous electrolyte secondary battery 10 comprises the wound electrode assembly 14, a non-aqueous electrolyte, and the exterior housing can 16 housing the electrode assembly 14 and the electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metallic container having an opening at one side in an axial direction, and the opening of the exterior housing can 16 is sealed with a sealing assembly 17. Hereinafter, for convenience of description, the sealing assembly 17 side of the battery will be described as the upper side, and the bottom side of the exterior housing can 16 will be described as the lower side.

The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like are used, for example. The non-aqueous solvent may contain a halogen-substituted derivative in which at least a hydrogen in these solvents are partially substituted with a halogen atom such as fluorine. For the electrolyte salt, a lithium salt such as $LiPF_6$ is used, for example. The electrolyte is not limited to a liquid electrolyte, and may be a solid electrolyte using a gel polymer or the like.

Any of the positive electrode 11, negative electrode 12, and separator 13, which constitute the electrode assembly 14 is a band-shaped elongated body, and spirally wound to be alternately stacked in a radial direction of the electrode assembly 14. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). Two separators 13 are formed to be one size larger than at least the positive electrode 11, and disposed to, for example, sandwich the positive electrode 11. The electrode assembly 14 has a positive electrode lead 20 connected to the positive electrode 11 by welding or the like and a negative electrode lead 21 connected to the negative electrode 12 by welding or the like.

Insulating plates 18 and 19 are disposed on the upper and lower sides of the electrode assembly 14, respectively. In the example illustrated in FIG. 1, the positive electrode lead 20 extends through a through hole in the insulating plate 18 toward a side of the sealing assembly 17, and the negative electrode lead 21 extends through an outside of the insulating plate 19 toward the bottom side of the exterior housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23, becomes a positive electrode terminal. The negative electrode lead 21 is connected to a bottom inner surface of the exterior housing can 16 by welding or the like, and the exterior housing can 16 becomes a negative electrode terminal.

A gasket 28 is provided between the exterior housing can 16 and the sealing assembly 17 to achieve sealability inside the battery. On the exterior housing can 16, a grooved portion 22 in which a part of a side part thereof projects inward for supporting the sealing assembly 17 is formed. The grooved portion 22 is preferably formed in a circular shape along a circumferential direction of the exterior housing can 16, and supports the sealing assembly 17 with the upper surface thereof. The sealing assembly 17 is fixed on the upper part of the exterior housing can 16 with the grooved portion 22 and with an end part of the opening of the exterior housing can 16 calked to the sealing assembly 17.

The sealing assembly 17 has a stacked structure of the internal terminal plate 23, a lower vent member 24, an insulating member 25, an upper vent member 26, and the cap 27 in this order from the electrode assembly 14 side. Each member constituting the sealing assembly 17 has, for example, a disk shape or a ring shape, and each member except for the insulating member 25 is electrically connected to each other. The lower vent member 24 and the upper vent member 26 are connected at each of central parts thereof, and the insulating member 25 is interposed between each circumferential part thereof. If the internal pressure of the battery increases due to abnormal heat generation, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through the cap 27 opening.

Hereinafter, the positive electrode 11, negative electrode 12, and separator 13, which constitute the electrode assembly 14, particularly a positive electrode active material constituting the positive electrode 11, will be described in detail.

[Positive Electrode]

The positive electrode 11 has a positive electrode core and a positive electrode mixture layer provided on a surface of the positive electrode core. For the positive electrode core, a foil of a metal stable within a potential range of the positive electrode 11, such as aluminum, a film in which such a metal is disposed on a surface layer thereof, and the like may be used. The positive electrode mixture layer includes a positive electrode active material, a binder, and a conductive agent, and is preferably provided on both surfaces of the positive electrode core except for a portion to which the positive electrode lead 20 is connected. The positive electrode 11 may be produced by, for example, applying a positive electrode mixture slurry including the positive electrode active material, the binder, the conductive agent, and the like on the surface of the positive electrode core, drying and subsequently compressing the applied film to form the positive electrode mixture layers on both the surfaces of the positive electrode core.

Examples of the conductive agent included in the positive electrode mixture layer may include a carbon material such as carbon black, acetylene black, Ketjenblack, graphite, carbon nanotube (CNT), and graphene. Examples of the binder included in the positive electrode mixture layer may include a fluororesin such as polytetrafluoroethylene (PTFE) and polyvinylidene fluoride (PVdF), polyacrylonitrile (PAN), a polyimide, an acrylic resin, and a polyolefin. With these resins, a cellulose derivative such as carboxymethyl cellulose (CMC) or a salt thereof, polyethylene oxide (PEO), and the like may be used in combination.

The positive electrode 11 includes a lithium-transition metal composite oxide containing Ni, Nb, M (M represents at least one element selected from the group consisting of Ca and Sr), and Co that is an optional component. Hereinafter, for convenience of description, the lithium-transition metal composite oxide is referred to as "composite oxide (Z)". The composite oxide (Z) functions as the positive electrode active material. The positive electrode active material is mainly composed of the composite oxide (Z), and may be composed of substantially only the composite oxide (Z). The positive electrode active material may include a composite oxide other than the composite oxide (Z) or another compound within a range in that an object of the present disclosure is not impaired.

The composite oxide (Z) may have a layered structure. The composite oxide (Z) has, for example, a layered structure belonging to the space group R-3m or a layered structure belonging to the space group C2/m.

The composite oxide (Z) is, for example, of secondary particles formed by aggregating a plurality of primary particles. A particle diameter of the primary particles is typically greater than or equal to 0.05 μm and less than or equal to 1 μm. A median diameter (D50) on a volumetric basis of the composite oxide (Z) is, for example, greater than or equal to 3 μm and less than or equal to 30 μm, and preferably greater than or equal to 5 μm and less than or equal to 25 μm. The D50 means a particle diameter at which a cumulative frequency is 50% from a smaller particle diameter side in a particle size distribution on a volumetric basis, which is referred to as "median diameter". The particle size distribution of the composite oxide (Z) may be measured by using a laser diffraction-type particle size distribution measuring device (for example, MT3000II, manufactured by MicrotracBEL Corp.) with water as a dispersion medium.

The composite oxide (Z) contains greater than or equal to 80 mol % of Ni based on a total number of moles of metal elements excluding Li. A content rate of Ni of greater than or equal to 80 mol % may yield a battery with a high energy density. The content rate of Ni may be greater than or equal to 85 mol %, or may be greater than or equal to 90 mol % based on the total number of moles of metal elements excluding Li. Ni contained in the composite oxide (Z) is a Ni source for the coating formed on the negative electrode surface. A part thereof is eluted with the charge and discharge to be deposited on the negative electrode surface, and contained in the coating of the negative electrode.

When the composite oxide (Z) contains Co, a content rate of Co is less than or equal to 5 mol % based on the total number of moles of metal elements excluding Li. The amount of Co used is preferably reduced because Co is expensive. The composite oxide (Z) preferably contains less than or equal to 2 mol % of Co based on the total number of moles of metal elements excluding Li, or contains substantially no Co. The description "contain substantially no Co" means a case where Co is absolutely not contained or a case where Co is mixed as an impurity (a case where an amount of Co that cannot be precisely quantified is mixed).

The content rate of Nb in the composite oxide (Z) is less than or equal to 0.35 mol %, and preferably less than or equal to 0.30 mol % based on the total number of moles of metal elements excluding Li. If the content rate of Nb is greater than 0.35 mol %, the resistance increases to lower the charge capacity. A lower limit of the content rate of Nb in the composite oxide (Z) is not particularly limited, and the composite oxide (Z) containing M, described later, and Nb yields the effect of improving the charge-discharge cycle characteristics with a synergistic effect of Nb and M. The content rate of Nb is preferably greater than or equal to 0.05 mol %. In this case, the effect of improving the charge-discharge cycle characteristics appears more obviously.

The content rate of M (M represents at least one element selected from the group consisting of Ca and Sr) in the composite oxide (Z) is less than or equal to 0.35 mol %, and preferably less than or equal to 0.30 mol % based on the total number of moles of metal elements excluding Li. If the content rate of M is greater than 0.35 mol %, the resistance increases to lower the charge capacity. A lower limit of the content rate of M in the composite oxide (Z) is not particularly limited, and the composite oxide (Z) containing the above Nb and M yields the effect of improving the charge-discharge cycle characteristics with the synergistic effect of M and Nb. The content rate of M is preferably greater than or equal to 0.05 mol %. In this case, the effect of improving the charge-discharge cycle characteristics appears more obviously.

Nb and M contained in the composite oxide (Z) inhibit, in the positive electrode, the generation and erosion of the deteriorated structure layer on the surface of the lithium-transition metal composite oxide due to the reaction with the electrolyte liquid and the like. Nb and M contained in the composite oxide (Z) are also a Nb source and an M source of the coating to be formed on the negative electrode surface. A part thereof is eluted with the charge and discharge to be deposited on the negative electrode surface, and contained in the coating of the negative electrode. The presence state of Nb in the composite oxide (Z) is not particularly limited, but Nb preferably forms a solid solution together with other metal elements such as Ni. Of Nb contained in the composite oxide (Z), greater than or equal to 80% more preferably forms a solid solution, and substantially all Nb particularly preferably forms a solid solution with the composite oxide. The amount of the solid solution of Nb may be measured by energy dispersive X-ray spectroscopy (EDS). The presence state of M contained in the composite oxide (Z) is not particularly limited, but M is preferably present on surfaces of the primary particles and surfaces of the secondary particles of the composite oxide (Z).

The composite oxide (Z) may contain a metal element other than Li, Ni, Nb, M, and Co. Examples of the metal element may include Mn, Al, Zr, B, Mg, Fe, Cu, Zn, Sn, Na, K, Ba, W, Mo, and Si. Among them, the composite oxide (Z) preferably contains at least one of Mn and Al. When the composite oxide (Z) contains Mn, a content rate of Mn is preferably greater than or equal to 1 mol % and less than or equal to 10 mol % based on the total number of moles of metal elements excluding Li. When the composite oxide (Z) contains Al, a content rate of Al is preferably greater than or equal to 1 mol % and less than or equal to 10 mol % based on the total number of moles of metal elements excluding Li.

The composite oxide (Z) preferably further contains W. This may further improve the charge-discharge cycle characteristics. W contained in the composite oxide (Z) inhibits, in the positive electrode, the generation and erosion of the deteriorated structure layer on the surface of the lithium-transition metal composite oxide due to the reaction with the electrolyte liquid and the like. W contained in the composite oxide (Z) is also a W source of the coating to be formed on the negative electrode surface. A part thereof is eluted with the charge and discharge to be deposited on the negative electrode surface, and contained in the coating of the negative electrode. A content rate of W in the composite oxide (Z) is preferably less than or equal to 0.5 mol %, and more preferably less than or equal to 0.4 mol % based on the total number of moles of metal elements excluding Li. A lower limit of the content rate of W in the composite oxide (Z) is not particularly limited, and may be, for example, greater than or equal to 0.01 mol %, or greater than or equal to 0.05 mol %. The presence state of W in the composite oxide (Z) is not particularly limited, and for example, W may be present on the surfaces of the primary particles and the surfaces of the secondary particles of the composite oxide (Z), and may form a solid solution with the composite oxide (Z).

An example of a preferable composite oxide (Z) is a composite oxide represented by the general formula $Li_aNi_bCo_cAl_dMn_eNb_fM_gO_h$, wherein $0.8{\le}a{\le}1.2$, $0.80{\le}b{<}1$, $0{\le}c{\le}0.05$, $0{\le}d{\le}0.10$, $0{\le}e{\le}0.10$, $0{<}f{\le}0.0035$, $0{<}g{\le}0.0035$, $1{\le}h{\le}2$, and $b+c+d+e+f+g=1$. Preferably, $0.85{\le}b{<}1$, $0{\le}c{\le}0.02$, $0{<}f{\le}0.0030$, and $0{<}g{\le}0.0030$. More preferably, $0.85{\le}b{<}0.95$, $0{\le}c{\le}0.01$, $0.0005{\le}f{\le}0.0030$, and $0.0005{\le}g{\le}0.0030$.

The content rates of the elements constituting the composite oxide (Z) may be measured with an inductively coupled plasma atomic emission spectroscopy analyzer (ICP-AES), an electron probe micro analyzer (EPMA), an energy dispersive X-ray analyzer (EDX), or the like.

The composite oxide (Z) may be synthesized by mixing and calcining transition metal oxides containing Ni, Al, Mn, and the like, a Nb raw material, an M raw material, and a Li raw material such as lithium hydroxide (LiOH), for example. The composite oxide (Z) may also be synthesized by: mixing and calcining transition metal oxides containing Ni, Al, Mn, and the like, a Nb raw material, and an M raw material to synthesize a composite oxide containing Ni, Nb, and M; and then adding a Li raw material to be calcined again. The calcination is performed, under an oxygen atmosphere at a temperature of greater than or equal to 600° C. and less than or equal to 800° C., for example. Examples of the Nb raw material include $Nb_2O_5$, $Nb_2O_5{\cdot}nH_2O$, $LiNbO_3$, and $NbCl_5$. Examples of the M raw material include $Ca(OH)_2$, CaO, $CaCO_3$, $CaSO_4$, $Ca(NO_3)_2$, $Sr(OH)_2$, $Sr(OH)_2{\cdot}8H_2O$, SrO, $SrCO_3$, $SrSO_4$, and $Sr(NO_3)_2$.

The composite oxide (Z) obtained in the above step is washed with water, and may be mixed with a W raw material and subjected to a heat treatment to allow the composite oxide (Z) to contain W. Alternatively, a W raw material may be mixed with the composite oxide (Z) obtained in the above step, and then washed with water and subjected to a heat treatment to allow the composite oxide (Z) to contain W. The heat treatment is performed in vacuo at a temperature of greater than or equal to 150° C. and less than or equal to 600° C., for example. Examples of the W raw material include tungsten oxide ($WO_3$) and lithium tungstate ($Li_2WO_4$, $Li_4WO_5$, or $Li_6W_2O_9$).

[Negative Electrode]

The negative electrode 12 has a negative electrode core and a negative electrode mixture layer provided on a surface of the negative electrode core. For the negative electrode core, a foil of a metal stable within a potential range of the negative electrode 12, such as copper, a film in which such a metal is disposed on a surface layer thereof, and the like may be used. The negative electrode mixture layer includes a negative electrode active material and a binder, and is preferably provided on, for example, both surfaces of the negative electrode core except for a portion to which the negative electrode lead 21 is connected. The negative electrode 12 may be produced by, for example, applying a negative electrode mixture slurry including the negative electrode active material, the binder, and the like on the surface of the negative electrode core, drying and subsequently compressing the applied film to form the negative electrode mixture layers on both the surfaces of the negative electrode core.

The negative electrode mixture layer includes, for example, a carbon-based active material to reversibly occlude and release lithium ions, as the negative electrode active material. The carbon-based active material is preferably a graphite such as: a natural graphite such as flake graphite, massive graphite, and amorphous graphite; and an artificial graphite such as massive artificial graphite (MAG) and graphitized mesophase-carbon microbead (MCMB). For the negative electrode active material, a Si-based active material composed of at least one of Si and a Si-containing compound may also be used, and the carbon-based active material and the Si-based active material may be used in combination.

For the binder included in the negative electrode mixture layer, a fluororesin, PAN, a polyimide, an acrylic resin, a polyolefin, and the like may be used similarly to the case of the positive electrode 11, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR; and CMC or a salt thereof, or PAA or a salt thereof are preferably used in combination.

The negative electrode 12 has a coating formed on a surface of the negative electrode mixture layer and containing Nb and M (M represents at least one element selected from the group consisting of Ca and Sr) (hereinafter, which may be referred to as "negative electrode coating"). The negative electrode coating is considered to be formed by deposition of Nb and M in the composite oxide (Z), eluted by the charge and discharge, on the surface of the negative electrode mixture layer. That is, the negative electrode coating contains Nb and M derived from the composite oxide (Z). The negative electrode coating is formed by, for example, charges and discharges in less than or equal to 10 cycles. Use of the composite oxide (Z) containing predetermined amounts of Nb and M and formation of the good coating on the negative electrode surface containing Nb and M derived from the positive electrode inhibit a lowering in capacity with the charge and discharge to yield good cycle characteristics. The presence of the negative electrode coating may be confirmed by, for example, X-ray photoelectron spectroscopy analysis (XPS).

The content rate of Nb in the negative electrode is greater than or equal to 10 ppm and less than or equal to 3000 ppm based on a total mass of the negative electrode mixture layer and the coating. If the content rate of Nb is less than 10 ppm or if the content rate of Nb is greater than 3000 ppm, the effect of improving the charge-discharge cycle characteristics is not obtained. The content rate of Nb in the negative electrode may be regulated with a composition, particularly the content rate of Nb, of the composite oxide (Z), a charge-discharge condition, or the like. For example, a higher charge termination voltage and a deeper discharge depth tend to increase the content rate of Nb in the negative electrode.

The content rate of Nb in the negative electrode based on the total mass of the negative electrode mixture layer and the coating may be calculated by the following method. A content rate of M, content rate of Ni, and content rate of W in the negative electrode, described later, may also be calculated by the same method.

(1) Ion-exchanged water is added to the negative electrode 12 to release the negative electrode mixture layer and the coating from the negative electrode core, and a weight of the negative electrode mixture layer and coating is measured.

(2) Aqua regia and hydrofluoric acid are added to the released negative electrode mixture layer and the coating, and heated to dissolve the released negative electrode mixture layer and the coating. An insoluble component therein, such as carbon, is filtered off to produce an aqueous solution. This aqueous solution is diluted with ion-exchanged water up to a predetermined volume. A concentration of Nb is measured by ICP-AES, and the result is specified as a content of Nb in the negative electrode.

(3) The content of Nb in the negative electrode, measured in (2), is divided by the weight of the negative electrode mixture layer and coating, measured in (1), to be specified as the content rate of Nb in the negative electrode.

The content rate of M in the negative electrode is greater than or equal to 10 ppm and less than or equal to 3000 ppm based on a total mass of the negative electrode mixture layer and the coating. If the content rate of M is less than 10 ppm or if the content rate of M is greater than 3000 ppm, the effect of improving the charge-discharge cycle characteristics is not obtained. The content rate of M in the negative electrode may be regulated with a composition, particularly the content rate of M, of the composite oxide (Z), a charge-discharge condition, or the like. For example, a higher charge termination voltage and a deeper discharge depth tend to increase the content rate of M.

The negative electrode coating may further contain Ni. Ni in the composite oxide (Z) eluted by the charge and discharge is considered to be deposited together with Nb and M on the surface of the negative electrode mixture layer to form the negative electrode coating. That is, the negative electrode coating contains Ni derived from the composite oxide (Z).

A mass ratio between the content rate of Nb and the content rate of Ni (Nb/Ni) in the negative electrode is preferably greater than or equal to 0.3 and less than or equal to 5. A mass ratio between the content rate of M and the content rate of Ni (M/Ni) in the negative electrode is preferably greater than or equal to 0.3 and less than or equal to 10. The Nb/Ni ratio and the M/Ni ratio within the above ranges may enhance the effect of improving the cycle characteristics. The Nb/Ni ratio and the M/Ni ratio may be regulated with a composition, particularly ratios of the content rates of Nb or M to Ni, of the composite oxide (Z), a charge-discharge condition, or the like.

When the lithium-transition metal composite oxide contained in the positive electrode contains W, a content rate of W in the negative electrode is greater than or equal to 10 ppm and less than or equal to 3000 ppm based on the total mass of the negative electrode mixture layer and the coating, and a mass ratio between the content rate of W and the content rate of Ni (W/Ni) is preferably greater than or equal to 0.3 and less than or equal to 5. This may further enhance the effect of improving the cycle characteristics.

The negative electrode may contain metal elements other than Nb, M, W, and Ni. The negative electrode includes, for example, an organic substance being a decomposition product of metal elements, such as Nb, M, W, and Ni, and the electrolyte.

[Separator]

For the separator 13, a porous sheet having an ion permeation property and an insulation property is used. Specific examples of the porous sheet include a fine porous thin film, a woven fabric, and a nonwoven fabric. As a material for the separator 13, a polyolefin such as polyethylene and polypropylene, cellulose, and the like are preferable. The separator 13 may have any of a single-layered structure and a stacked structure. On a surface of the separator, a heat-resistant layer and the like may be formed.

EXAMPLES

Hereinafter, the present disclosure will be further described with Examples, but the present disclosure is not limited to these Examples.

Example 1

[Synthesis of Lithium-Transition Metal Composite Oxide (Positive Electrode Active Material)]

A composite oxide represented by the general formula $Ni_{0.93}Al_{0.05}Mn_{0.02}O_2$, niobium hydroxide ($Nb_2O_5 \cdot nH_2O$), and calcium hydroxide ($Ca(OH)_2$) were mixed so that a content rate of Nb was 0.35 mol % and a content rate of Ca was 0.3 mol % based on a total amount of Ni, Al, and Mn of the composite oxide. Lithium hydroxide (LiOH) was further mixed so that a molar ratio of a total amount of Ni, Al, Mn, Nb, and Ca, to Li was 1:1.03. This mixture was fed into a calcination funnel, and calcined under an oxygen flow with an oxygen concentration of 95% (flow rate of 2 mL/min per 10 $cm^3$ and 5 L/min per kg of the mixture) at a heating rate of 2.0° C./min from a room temperature to 650° C. Thereafter, the mixture was calcined at a heating rate of 0.5° C./min from 650° C. to 715° C., and the calcined product was washed with water to obtain a lithium-transition metal composite oxide. Table 1 shows an analysis result of the lithium-transition metal composite oxide by ICP-AES.

[Production of Positive Electrode]

The above lithium-transition metal composite oxide was used as a positive electrode active material. The positive electrode active material, acetylene black, and polyvinylidene fluoride (PVdF) were mixed at a solid-content mass ratio of 95:3:2, an appropriate amount of N-methyl-2-pyrrolidone (NMP) was added, and then the mixture was kneaded to prepare a positive electrode mixture slurry. This positive electrode mixture slurry was applied on both surfaces of a positive electrode core made of aluminum foil, the applied film was dried and then rolled by using a roller, and cut into a predetermined electrode size to obtain a positive electrode in which positive electrode mixture layers were formed on both the surfaces of the positive electrode core. On a part of the positive electrode, an exposed portion where the surface of the positive electrode core was exposed was provided.

[Production of Negative Electrode]

A natural graphite was used as a negative electrode active material. The negative electrode active material, sodium carboxymethylcellulose (CMC-Na), and styrene-butadiene rubber (SBR) were mixed in an aqueous solution at a solid-content mass ratio of 100:1:1 to prepare a negative electrode mixture slurry. This negative electrode mixture slurry was applied on both surfaces of a negative electrode core made of copper foil, the applied film was dried and then rolled by using a roller, and cut into a predetermined electrode size to obtain a negative electrode in which negative electrode mixture layers were formed on both the surfaces of the negative electrode core. On a part of the negative electrode, an exposed portion where the surface of the negative electrode core was exposed was provided.

[Preparation of Non-Aqueous Electrolyte]

Ethylene carbonate (EC), methyl ethyl carbonate (MEC), and dimethyl carbonate (DMC) were mixed at a volume ratio of 3:3:4. In this mixed solvent, lithium hexafluorophosphate ($LiPF_6$) was dissolved so that the concentration was 1.2 mol/L to prepare a non-aqueous electrolyte liquid.

[Production of Test Cell (Non-Aqueous Electrolyte Secondary Battery)]

An aluminum lead was attached to the exposed portion of the positive electrode, and a nickel lead was attached to the exposed portion of the negative electrode. The positive electrode and the negative electrode were spirally wound with a separator made of a polyolefin interposed therebetween, and then press-molded in the radial direction to produce a flat, wound electrode assembly. This electrode assembly was housed in an exterior constituted with an aluminum laminated sheet, the above non-aqueous electrolyte liquid was injected thereinto, and an opening of the exterior was sealed to obtain a test cell.

[Evaluation of Capacity Maintenance Rate after Cycle Test]

Under a temperature environment of 25° C., the test cell was charged at a constant current of 0.5 It until a battery voltage reached 4.1 V, and charged at a constant voltage of 4.1 V until a current value reached 1/50 It. Thereafter, the test cell was discharged at a constant current of 0.5 It until the battery voltage reached 2.85 V. This charge-discharge cycle was repeated for 100 cycles. A discharge capacity at the 1st cycle and a discharge capacity at the 100th cycle in the cycle test were determined, and a capacity maintenance rate was calculated with the following formula.

Capacity Maintenance Rate (%)=(Discharge Capacity at 100th Cycle/Discharge Capacity at 1st Cycle)×100

Example 2

A test cell was produced to evaluate the performance in the same manner as in Example 1 except that, in the synthesis of the positive electrode active material: a composite oxide represented by the general formula $Ni_{0.92}Al_{0.05}Mn_{0.03}O_2$ was used; and this composite oxide, $Nb_2O_5nH_2O$, and strontium hydroxide ($Sr(OH)_2$) were mixed so that the content rate of Nb was 0.25 mol % and a content rate of Sr was 0.1 mol %.

Example 3

A test cell was produced to evaluate the performance in the same manner as in Example 2 except that, in the synthesis of the positive electrode active material, the composite oxide, $Nb_2O_5nH_2O$, and $Sr(OH)_2$ were mixed so that the content rate of Sr was 0.3 mol %.

Example 4

A test cell was produced to evaluate the performance in the same manner as in Example 2 except that, in the synthesis of the positive electrode active material, the composite oxide, $Nb_2O_5·nH_2O$, and $Ca(OH)_2$ were mixed so that a content rate of Ca was 0.1 mol %.

Example 5

A test cell was produced to evaluate the performance in the same manner as in Example 2 except that, in the synthesis of the positive electrode active material, the composite oxide, $Nb_2O_5·nH_2O$, and $Ca(OH)_2$ were mixed so that a content rate of Ca was 0.2 mol %.

Example 6

A test cell was produced to evaluate the performance in the same manner as in Example 2 except that, in the synthesis of the positive electrode active material, the composite oxide, $Nb_2O_5·nH_2O$, $Ca(OH)_2$, and $Sr(OH)_2$ were mixed so that a content rate of Ca was 0.1 mol % and the content rate of Sr was 0.5 mol %.

Example 7

A test cell was produced to evaluate the performance in the same manner as in Example 1 except that, in the synthesis of the positive electrode active material: a composite oxide represented by the general formula $Ni_{0.91}Al_{0.05}Mn_{0.04}O_2$ was used; and this composite oxide, $Nb_2O_5·nH_2O$, and strontium hydroxide ($Sr(OH)_2$) were mixed so that the content rate of Nb was 0.2 mol % and a content rate of Sr was 0.1 mol %.

Example 8

A test cell was produced to evaluate the performance in the same manner as in Example 7 except that, in the synthesis of the positive electrode active material, the composite oxide, $Nb_2O_5·nH_2O$, and $Ca(OH)_2$ were mixed so that the content rate of Ca was 0.2 mol %.

Example 9

A test cell was produced to evaluate the performance in the same manner as in Example 1 except that, in the synthesis of the positive electrode active material: a composite oxide represented by the general formula $Ni_{0.88}Co_{0.01}Al_{0.05}Mn_{0.06}O_2$ was used; and this composite oxide, $Nb_2O_5·nH_2O$, and strontium hydroxide ($Sr(OH)_2$) were mixed so that the content rate of Nb was 0.1 mol % and a content rate of Sr was 0.3 mol %.

Example 10

A test cell was produced to evaluate the performance in the same manner as in Example 1 except that, in the synthesis of the positive electrode active material: a composite oxide represented by the general formula $Ni_{0.88}Co_{0.01}Al_{0.05}Mn_{0.06}O_2$ was used; and this composite oxide, $Nb_2O_5 \cdot nH_2O$, and $Ca(OH)_2$ were mixed so that the content rate of Nb was 0.2 mol % and the content rate of Ca was 0.2 mol %.

Example 11

A test cell was produced to evaluate the performance in the same manner as in Example 2 except that, in the synthesis of the positive electrode active material: the composite oxide, $Nb_2O_5 \cdot nH_2O$, and $Sr(OH)_2$ were mixed so that the content rate of Sr was 0.3 mol % to be calcined under an oxygen flow; and after the calcined product was washed with water, $WO_3$ was mixed and dried so that a content rate of W was 0.4 mol %.

Example 12

A test cell was produced to evaluate the performance in the same manner as in Example 11 except that, in the synthesis of the positive electrode active material, the composite oxide, $Nb_2O_5 \cdot nH_2O$, $Ca(OH)_2$, and $WO_3$ were mixed so that the content rate of Ca was 0.5 mol % and a content rate of W was 0.2 mol %.

Example 13

A test cell was produced to evaluate the performance in the same manner as in Example 11 except that, in the synthesis of the positive electrode active material, the composite oxide, $Nb_2O_5 \cdot nH_2O$, $Sr(OH)_2$, $Ca(OH)_2$, and $WO_3$ were mixed so that the content rate of Sr was 0.1 mol %, the content rate of Ca was 0.5 mol %, and the content rate of W was 0.2 mol %.

Comparative Example 1

A test cell was produced to evaluate the performance in the same manner as in Example 1 except that, in the synthesis of the positive electrode active material, neither $Nb_2O_5 \cdot nH_2O$ nor $Ca(OH)_2$ was added.

Comparative Example 2

A test cell was produced to evaluate the performance in the same manner as in Example 2 except that, in the synthesis of the positive electrode active material, neither $Nb_2O_5 \cdot nH_2O$ nor $Sr(OH)_2$ was added.

Comparative Example 3

A test cell was produced to evaluate the performance in the same manner as in Example 2 except that, in the synthesis of the positive electrode active material, no $Sr(OH)_2$ was added.

Comparative Example 4

A test cell was produced to evaluate the performance in the same manner as in Example 2 except that, in the synthesis of the positive electrode active material, no $Nb_2O_5 \cdot nH_2O$ was added.

Comparative Example 5

A test cell was produced to evaluate the performance in the same manner as in Example 7 except that, in the synthesis of the positive electrode active material, neither $Nb_2O_5 \cdot nH_2O$ nor $Sr(OH)_2$ was added.

Comparative Example 6

A test cell was produced to evaluate the performance in the same manner as in Example 9 except that, in the synthesis of the positive electrode active material, neither $Nb_2O_5 \cdot nH_2O$ nor $Sr(OH)_2$ was added.

Comparative Example 7

A test cell was produced to evaluate the performance in the same manner as in Example 10 except that, in the synthesis of the positive electrode active material, neither $Nb_2O_5 \cdot nH_2O$ nor $Ca(OH)_2$ was added.

Table 1 shows the capacity maintenance rates of Examples 1 to 10 and Comparative Examples 1 to 7. Table 2 shows the capacity maintenance rates of Examples 11 to 13 and Comparative Examples 2 and 3. Table 1 also shows: the composition of the positive electrode active material; and the contents of Nb and M, Nb/Ni ratio, and M/Ni ratio in the negative electrode. Table 2 also shows: the composition of the positive electrode active material; and the contents of Nb, M, and W, Nb/Ni ratio, M/Ni ratio, and W/Ni ratio in the negative electrode. The contents of Nb, M, and W in the negative electrode and the ratios thereof to Ni were determined by measuring the negative electrode taken out by disassembling the test cell after the cycle test. XPS demonstrated that, in any negative electrodes of Examples 1 to 13, the negative electrode coating was formed on a surface of the negative electrode mixture layer.

TABLE 1

| | | | | | Composition of positive electrode active material | | | | | | Evaluation result |
| | | | | | Nb (externally added) | M (externally added) | | Negative electrode | | | | Capacity maintenance rate |
| | Ni | Co | Al | Mn | | Sr | Ca | Nb content [ppm] | Ni content (ppm) | Nb/ Ni | M/ Ni | |
|---|---|---|---|---|---|---|---|---|---|---|---|---|
| Example1 | 93 | — | 5 | 2 | 0.35 | — | 0.3 | 1548 | 1504 | 4.93 | 4.79 | 29.7 |
| Example2 | 92 | — | 5 | 3 | 0.25 | 0.3 | — | 862 | 365 | 0.90 | 0.38 | 87.5 |
| Example3 | 92 | — | 5 | 3 | 0.25 | 0.3 | — | 660 | 740 | 3.19 | 3.57 | 90.1 |
| Example4 | 92 | — | 5 | 3 | 0.25 | — | 0.1 | 696 | 498 | 0.71 | 0.51 | 89.2 |
| Example5 | 92 | — | 5 | 3 | 0.25 | — | 0.2 | 804 | 1524 | 1.17 | 2.22 | 90.7 |
| Example6 | 92 | — | 5 | 3 | 0.25 | 0.1 | 0.5 | 695 | 2667 | 2.49 | 9.54 | 93.2 |
| Example7 | 91 | — | 5 | 4 | 0.2 | 0.1 | — | 587 | 446 | 2.48 | 1.89 | 87.2 |

TABLE 1-continued

| | Composition of positive electrode active material | | | | | | | Negative electrode | | | | Evaluation result Capacity |
| | Ni | Co | Al | Mn | Nb (externally added) | M (externally added) Sr | Ca | Nb content [ppm] | Ni content (ppm) | Nb/ Ni | M/ Ni | maintenance rate |
|---|---|---|---|---|---|---|---|---|---|---|---|---|
| Example8 | 91 | — | 5 | 4 | 0.2 | — | 0.2 | 630 | 944 | 1.01 | 1.52 | 88.5 |
| Example9 | 88 | 1 | 5 | 6 | 0.1 | 0.3 | — | 342 | 1281 | 0.31 | 1.16 | 89.3 |
| Example10 | 85 | — | 5 | 10 | 0.2 | — | 0.2 | 674 | 457 | 1.83 | 1.24 | 86.8 |
| Comparative Example1 | 93 | — | 5 | 2 | — | — | — | — | — | — | — | 73.5 |
| Comparative Example2 | 92 | — | 5 | 3 | — | — | — | — | — | — | — | 75.6 |
| Comparative Example3 | 92 | — | 5 | 3 | 0.25 | — | — | 628 | — | 1.11 | — | 80.3 |
| Comparative Example4 | 92 | — | 5 | 3 | — | 0.1 | — | — | 264 | — | 0.30 | 82.2 |
| Comparative Example5 | 91 | — | 5 | 4 | — | — | — | — | — | — | — | 79.4 |
| Comparative Example6 | 88 | 1 | 5 | 6 | — | — | — | — | — | — | — | 80.9 |
| Comparative Example7 | 85 | — | 5 | 10 | — | — | — | — | — | — | — | 23.2 |

TABLE 2

| | Composition of positive electrode actave material | | | | | | | | Negative electrode | | | | | | Evaluation result Capacity |
| | Ni | Co | Al | Mn | Nb (externally added) | M (externally added) Sr | Ca | W (externally added) | Nb content [ppm] | M content [ppm] | W content [ppm] | M/ Ni | M/ N | W/ Ni | mainten- ance rate |
|---|---|---|---|---|---|---|---|---|---|---|---|---|---|---|---|
| Example11 | 92 | — | 5 | 3 | 0.25 | 0.3 | — | 0.4 | 733 | 894 | 1775 | 0.80 | 0.97 | 1.91 | 91.1 |
| Example12 | 92 | — | 5 | 3 | 0.25 | — | 0.5 | 0.2 | 414 | 622 | 508 | 1.06 | 1.59 | 1.30 | 91.3 |
| Example13 | 92 | — | 5 | 3 | 0.25 | 0.1 | 0.5 | 0.2 | 850 | 2313 | 372 | 1.44 | 3.58 | 0.63 | 91.5 |
| Comparative Example2 | 92 | — | 5 | 3 | — | — | — | — | — | — | — | — | — | — | 75.6 |
| Comparative Example3 | 92 | — | 5 | 3 | 0.25 | — | — | — | 628 | — | — | 1.11 | — | — | 50.3 |

As shown in Table 1, any of the test cells of Examples have higher capacity maintenance rates after the cycle test than the corresponding test cells of Comparative Examples (Example 1 and Comparative Example 1, Examples 2 to 6 and Comparative Examples 2 to 4, Examples 7 and 8 and Comparative Example 5, Example 9 and Comparative Example 6, and Example 10 and Comparative Example 7), and excellent charge-discharge cycle characteristics. In the test cells of Examples 1 to 10, the positive electrode active material containing Nb and M (M represents at least one element selected from the group consisting of Ca and Sr) is used, and the coating containing Nb and M derived from the positive electrode active material was formed on the negative electrode surface. Meanwhile, in the test cells of Comparative Examples 1 to 7, no Nb nor M is contained in the positive electrode active material, and the coating containing Nb and M does not exist on the negative electrode surface. From a comparison between the results of Example 2 and Comparative Examples 3 and 4, it is understood that the positive electrode active material containing both Nb and M specifically improves the capacity maintenance rate com-pared with the positive electrode active material containing either Nb or M. That is, the positive electrode active material containing predetermined amounts of Nb and M and the negative electrode coating containing predetermined amounts of Nb and M derived from this positive electrode active material remarkably improve the charge-discharge cycle characteristics of the battery.

From the results of Examples 11 to 13, it is understood that the positive electrode active material further containing W also yields the effect of improving the charge-discharge cycle characteristics.

REFERENCE SIGNS LIST

Secondary battery, 11 Positive electrode, 12 Negative electrode, 13 Separator, 14 Electrode assembly, 16 Exterior, 17 Sealing assembly, 18, 19 Insulating plate, 20 Positive electrode lead, 21 Negative electrode lead, 22 Grooved portion, 23 Internal terminal plate, 24 Lower vent member, 25 Insulating member, 26 Upper vent member, 27 Cap, 28 Gasket

The invention claimed is:

1. A non-aqueous electrolyte secondary battery, comprising:
   a positive electrode;
   a negative electrode; and
   a non-aqueous electrolyte,
   wherein the positive electrode includes a lithium-transition metal composite oxide containing Ni, Nb, M (M represents at least one element selected from the group consisting of Ca and Sr), and Co that is an optional component,
   wherein, in the lithium-transition metal composite oxide,
   a content rate of Ni is greater than or equal to 80 mol % based on a total number of moles of metal elements excluding Li,
   a content rate of Nb is less than or equal to 0.35 mol % based on the total number of moles of metal elements excluding Li,
   a content rate of M is less than or equal to 1 mol % based on the total number of moles of metal elements excluding Li,
   a content rate of Co is less than or equal to 5 mol % based on the total number of moles of metal elements excluding Li,
   wherein the negative electrode has a negative electrode mixture layer including a negative electrode active material, and a coating containing Nb and M formed on a surface of the negative electrode mixture layer,
   wherein, in the negative electrode,
   a content rate of Nb is greater than or equal to 10 ppm and less than or equal to 3000 ppm based on a total mass of the negative electrode mixture layer and the coating, and
   a content rate of M is greater than or equal to 10 ppm and less than or equal to 3000 ppm based on the total mass of the negative electrode mixture layer and the coating.

2. The non-aqueous electrolyte secondary battery according to claim 1, wherein the lithium-transition metal composite oxide contains less than or equal to 2 mol % of Co based on the total number of moles of metal elements excluding Li, or contains substantially no Co.

3. The non-aqueous electrolyte secondary battery according to claim 1, wherein the content rate of Ni in the lithium-transition metal composite oxide is greater than or equal to 85 mol % based on the total number of moles of metal elements excluding Li.

4. The non-aqueous electrolyte secondary battery according to claim 1, wherein in the negative electrode,
   a mass ratio between the content rate of Nb and the content rate of Ni, Nb/Ni, is greater than or equal to 0.3 and less than or equal to 5, and
   a mass ratio between the content rate of M and the content rate of Ni, M/Ni, is greater than or equal to 0.3 and less than or equal to 10.

5. The non-aqueous electrolyte secondary battery according to claim 1, wherein
   the lithium-transition metal composite oxide further contains W,
   in the negative electrode,
   a content rate of W is greater than or equal to 10 ppm and less than or equal to 3000 ppm based on a total mass of the negative electrode mixture layer and the coating, and
   a mass ratio between the content rate of W and the content rate of Ni, W/Ni, is greater than or equal to 0.3 and less than or equal to 5.

6. The non-aqueous electrolyte secondary battery according to claim 1, wherein the coating further contains Ni.

* * * * *